US012608495B2

(12) United States Patent
Venture et al.

(10) Patent No.: US 12,608,495 B2
(45) Date of Patent: Apr. 21, 2026

(54) SYSTEMS AND METHODS FOR EFFICIENT CONTENT PACKAGING

(71) Applicant: NBCUniversal Media, LLC, New York, NY (US)

(72) Inventors: Vim Venture, Rancho Palas Verdes, CA (US); Robert Galluccio, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 235 days.

(21) Appl. No.: 18/526,235

(22) Filed: Dec. 1, 2023

(65) Prior Publication Data

US 2025/0181738 A1 Jun. 5, 2025

(51) Int. Cl.
*G06F 21/62* (2013.01)

(52) U.S. Cl.
CPC ................................. *G06F 21/6209* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 2005/0021539 A1* | 1/2005 | Short ...................... | H03M 7/40 |
| 2005/0065890 A1* | 3/2005 | Benaloh ................ | H04L 9/0836 |
| | | | 705/51 |
| 2005/0276416 A1* | 12/2005 | Zhu ................... | H04N 21/26613 |
| | | | 348/E7.056 |
| 2016/0198202 A1* | 7/2016 | Van Brandenburg ........................ | |
| | | | H04N 21/2347 |
| | | | 725/31 |
| 2017/0262638 A1* | 9/2017 | Horowitz .............. | G06F 16/252 |
| 2023/0409534 A1* | 12/2023 | Kashi Visvanathan ..................... | |
| | | | G06F 11/2023 |

* cited by examiner

*Primary Examiner* — Vance M Little
(74) *Attorney, Agent, or Firm* — Fletcher Yoder, P.C.

(57) ABSTRACT

Techniques are provided herein for efficient packaging of digital content. In particular, at least a portion of generated segments of digital content are used in both a single-key encrypted implementation of the content and a multi-key implementation of the content. This may result in content packaging processing and storage efficiencies.

15 Claims, 6 Drawing Sheets

500

```
<AdaptationSet contentType="video" group="1" mimeType="video/mp4" segmentAlignment="true" startWithSAP="1" subsegmentAlignment="true" subsegmentStartsWithSAP="1" maxWidth="1280" maxHeight="720"
frameRate="24000/1001" par="16:9" sar="1:1">
  <ContentProtection cenc:default_KID="00383219-10b9-2c88-621d-76e9822ad6fc" schemeIdUri="urn:mpeg:dash:mp4protection:2011" value="cenc"/>
  <ContentProtection schemeIdUri="urn:uuid:3a04f079-9840-4286-ab92-e65be0883595">
    <cenc:pssh>AAADYnBzc2gAAAAAmg1weZ...SINGLE-KEY_PSSH...ASABFAEEARABFAFIAPgA==</cenc:pssh>
    <mspr:IsEncrypted>1</mspr:IsEncrypted>
    <mspr:IV_Size>8</mspr:IV_Size>
    <mspr:kid>GTI4ALKQkOxiHXbpgqIW/A==</mspr:kid>
    <mspr:pro>QgMAAAEAAQA4AZw...SINGLE-KEY_PSSH...NAEgARQBAEQARQBSAD4A</mspr:pro>
  </ContentProtection>
  <ContentProtection schemeIdUri="urn:uuid:edef8ba9-79d6-4ace-a3c8-27dcd51d21ed">
    <cenc:pssh>AAAAOHBzc2gAAAAA7e+LqXnWS6jyC6LROh7QAAABgSEAA4MhkQuSjYh126Ylq1vxI49vWmwY=</cenc:pssh>
  </ContentProtection>
  <Accessibility schemeIdUri="urn:scte:dash:cc:cea-708:2015" value="1" lang:eng:2=lang:spa"/>
  <Representation bandwidth="1852132" codecs="avc1.4D401F" height="540" id="video_1852132" scanType="progressive" width="960">
    <SegmentTemplate timescale="24000" initialization="1850k_540_cmaf/$Kinit_mp4" media="1850k_540_cmaf/CommonSegs$Number$.mp4" startNumber="0">
      <SegmentTimeline>
        Segment Timeline
        Details...
      </SegmentTimeline>
    </SegmentTemplate>
  </Representation>
```

```
<AdaptationSet contentType="video" group="1" mimeType="video/mp4" segmentAlignment="true" startWithSAP="1" subsegmentAlignment="true" subsegmentStartsWithSAP="1" id="0" maxWidth="1280" maxHeight="720"
frameRate="24000/1001" par="16:9" sar="1:1">
<ContentProtection cenc:default_KID="00383219-10b9-2c88-621d-76e8822ad6fc" schemeIdUri="urn:mpeg:dash:mp4protection:2011" value="cenc" />
<ContentProtection schemeIdUri="urn:uuid:9a04f079-9840-4286-ab92-e65be0885f95">
<cenc:pssh>AAAD9nBzc2gAAA...MULTI-KEY PSSH... gARQBBAEQARQBSAD4A==</cenc:pssh>
<mspr:isEncrypted>1</mspr:isEncrypted>
<mspr:IV_Size>8</mspr:IV_Size>
<mspr:kid>GTI4ALKQiCxiHXSpgirN/A==</mspr:kid>
<mspr:pro>IgMAAAEAAQA4AzwBSA ...MULTI-KEY PSSH...IAEUAQQBEAEUAUIgA+AA==</mspr:pro>
</ContentProtection>
<ContentProtection schemeIdUri="urn:uuid:edef8ba9-79d6-4ace-a3c8-27dcd51d21ed">
<cenc:pssh>AAAAOHBzc2gAAAAA7e+LqXnWSs6jCfciROh7QAAABgSEAA4MhkQuSyIYh126Yiq1vxl49y/mwY< /cenc:pssh>
</ContentProtection>
<Accessibility schemeIdUri="urn:scte:dash:cc:cea-708:2015" value="1" lang:eng_2=lang:spa" />
<Representation bandwidth="1852132" codecs=avc1.4D401F" height="540" id="video_1852132" scanType="progressive" width="960" />
<SegmentTemplate timescale="24000" initialization="1850k_540_cmaf/MKInit_.mp4" media="1850k_540_cmaf/CommonSegs$Number$.mp4" startNumber="0">
<SegmentTimeline>
Segment Timeline
Details.
</SegmentTimeline>
</SegmentTemplate>
</Representation>
```

SYSTEMS AND METHODS FOR EFFICIENT CONTENT PACKAGING

BACKGROUND

The present disclosure relates generally to digital content and more specifically to techniques that enable efficient generation and storage of content segments across single-key and multi-key encryption implementations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, in digital rights management (DRM), different key implementations may be implemented to provide content protection via encryption. In single-key encryption implementations, a single key may be used to decrypt content for playback (e.g., both video and audio segments may be decrypted via a common key). In multi-key implementations, multiple keys may be used to decrypt the content for playback (e.g., one key for video and a second key for audio). Further, different versions (e.g., resolutions) of the content may each utilize a different key or set of keys for decryption. As may be appreciated, multi-key implementations may provide increased protection, as multiple keys may be required to decrypt the content for playback. Unfortunately, however, not all content players support multi-key implementations and, thus, to support less sophisticated content players, a single-key implementation may be provided, at least for a single version of the content.

Even when a single-key implementation is provided, it may be desirable to protect other versions of the content via a multi-key implementation to add enhanced security protections for these versions (e.g., to prevent content piracy). To support single-key and multi-key implementations in combination, a packaging system typically generates separate single-key and multi-key manifests, each pointing to their own separate segments encrypted via a single key and multiple keys, respectively. For example, a single-key manifest may point to a first set of standard definition (SD) media segments encrypting use a first key, while a multi-key manifest may point to a second set of SD media segments encrypted use the same first key. This results in generative processing that creates two separate and duplicative sets of segments, leading to processing and storage inefficiencies, as duplicated segments are generated and stored to support these two implementations.

Attempts to combine the single-key manifest with the multi-key manifest to create a combined or composite manifest have not solved this problem efficiently, as such combination has resulted in multi-key capable devices generating inefficient and undesirable license requests, based upon the combined manifest pointing to content segments that are mixed single/multi-key. As such, a need exists to enable a single bucket of media files (e.g., SD media files) that can be shared between multi-key and single-key manifests.

BRIEF DESCRIPTION

Embodiments provided herein aim to increase processing and storage efficiencies when both single-key and multi-key implementation offerings of digital content are provided. The efficiencies are gained by implementing a hybrid approach where segments generated and used in a single-key implementation are also used in the multi-key implementation. To do this, these segments are pointed to in both the single-key implementation (e.g., in the single-key manifest) and the multi-key implementation (e.g., in the multi-key manifest). In this manner, during segment generation, for each version of the content, only one set of segments is generated rather than having separate segments generated for each of the single-key and multi-key implementations. For the segments that are used in both single-key and multi-key implementations, a common key is used in both the single-key and the multi-key implementation, while segments only found in the multi-key implementation may use different keys. The corresponding Protection System Specific Header (PSSH) information used in digital rights management (DRM) to encrypt/decrypt the digital content may be embedded into a corresponding INIT segment. As mentioned above, for the segments in both single-key and multi-key implementations, the single- and multi-key responses for the Content Protection Information Exchange (CPIX) documents used during packaging and license requests used during playback may return the same encryption key. This ensures that these segments are encrypted with the same key, regardless of if the request was single or multi-key. Thus, two INIT segments may be generated for each version of the content, a single-key INIT segment and a multi-key INIT segment. Each manifest (single-key or multi-key) then references the appropriate INIT segment (single-key or multi-key). The multi-key INIT segment may have at least two keys: a first key that is identical to the encryption key used to encrypt the segments protected via the single-key implementation and a second one or more keys that are unique to the multi-key implementation that protect segments exclusively offered in the multi-key implementation. Further, a combination of the first key and the second key may be used, in some instances, to decrypt a particular version for playback. For example, a second key may be used to decrypt a particular version of video, while the audio track may have been protected via the single-key implementation and, thus, the first key may be used in its decryption.

In one embodiment, a tangible, non-transitory, computer-readable medium, includes computer-readable instructions that, when executed by one or more processors of one or more computers, cause the one or more computers to: receive encoded content; and package the encoded content into encrypted content segments via common segment hybrid encryption packaging that creates a single-key encryption implementation and a multi-key encryption implementation where at least a portion of the encrypted content segments are common to both the single-key encryption implementation and the multi-key encryption implementation.

In another embodiment, a computer-implemented method includes: receiving encoded content; and packaging the encoded content into encrypted content segments via common segment hybrid encryption packaging that creates a single-key encryption implementation and a multi-key encryption implementation where at least a portion of the encrypted content segments are common to both the single-key encryption implementation and the multi-key encryption implementation.

In yet another embodiment, a system, includes: a single-key manifest, a multi-key manifest, and a datastore. The datastore stores a single copy of encrypted content segments of a particular encoded version of content indicated as playback segments in both the single-key manifest of a single-key encryption implementation and the multi-key manifest of a multi-key encryption implementation.

BRIEF DESCRIPTION OF THE DRAWINGS

FIG. 5 is an illustrative example of a single-key manifest, in accordance with one or more embodiments of the present disclosure; and FIG. 6 is an illustrative example of a multi-key manifest, in accordance with one or more embodiments of the present disclosure.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
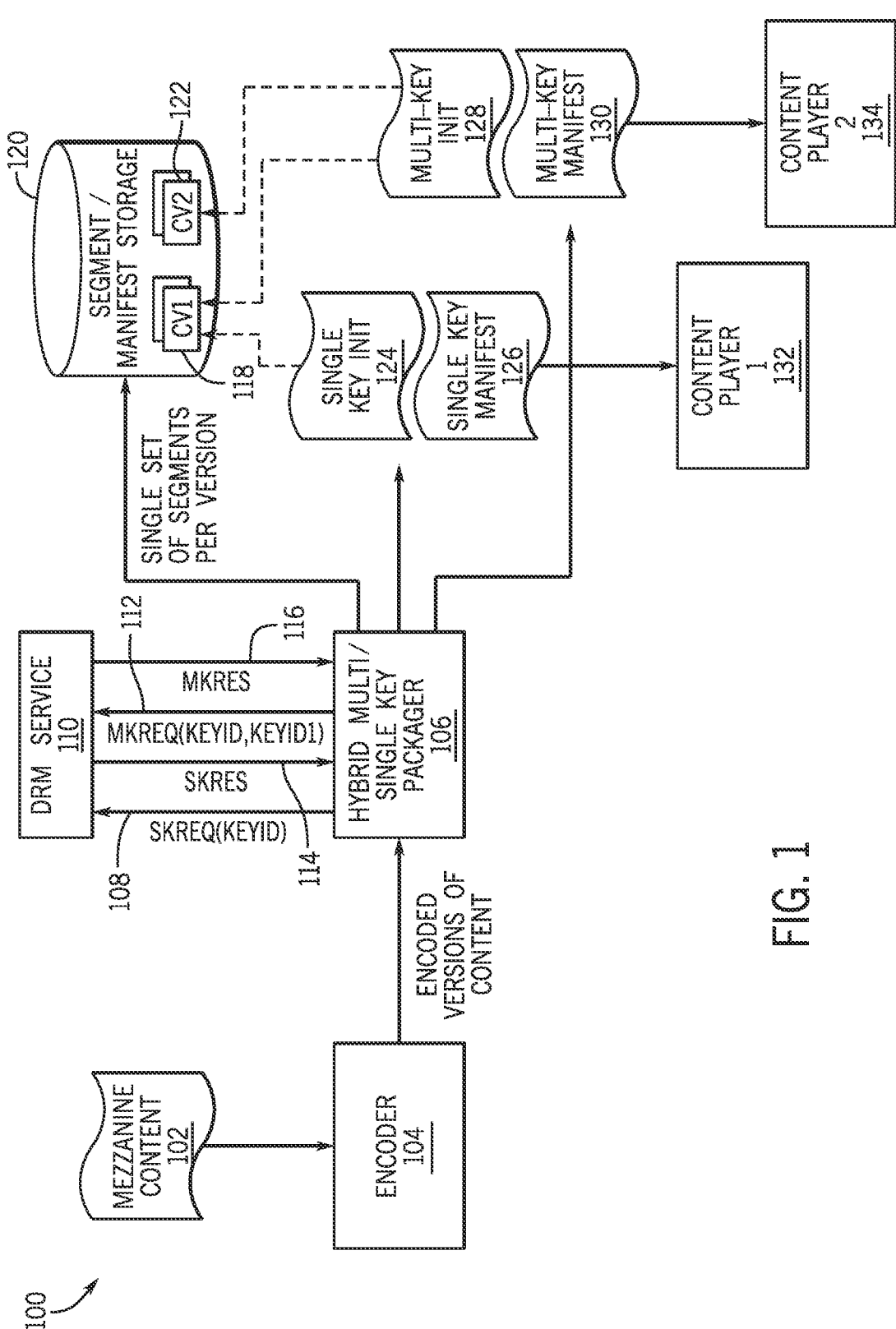
FIG. 1 is a schematic diagram of a system that provides common segment hybrid encryption packaging, in accordance with one or more embodiments of the present disclosure.
Figure 2:
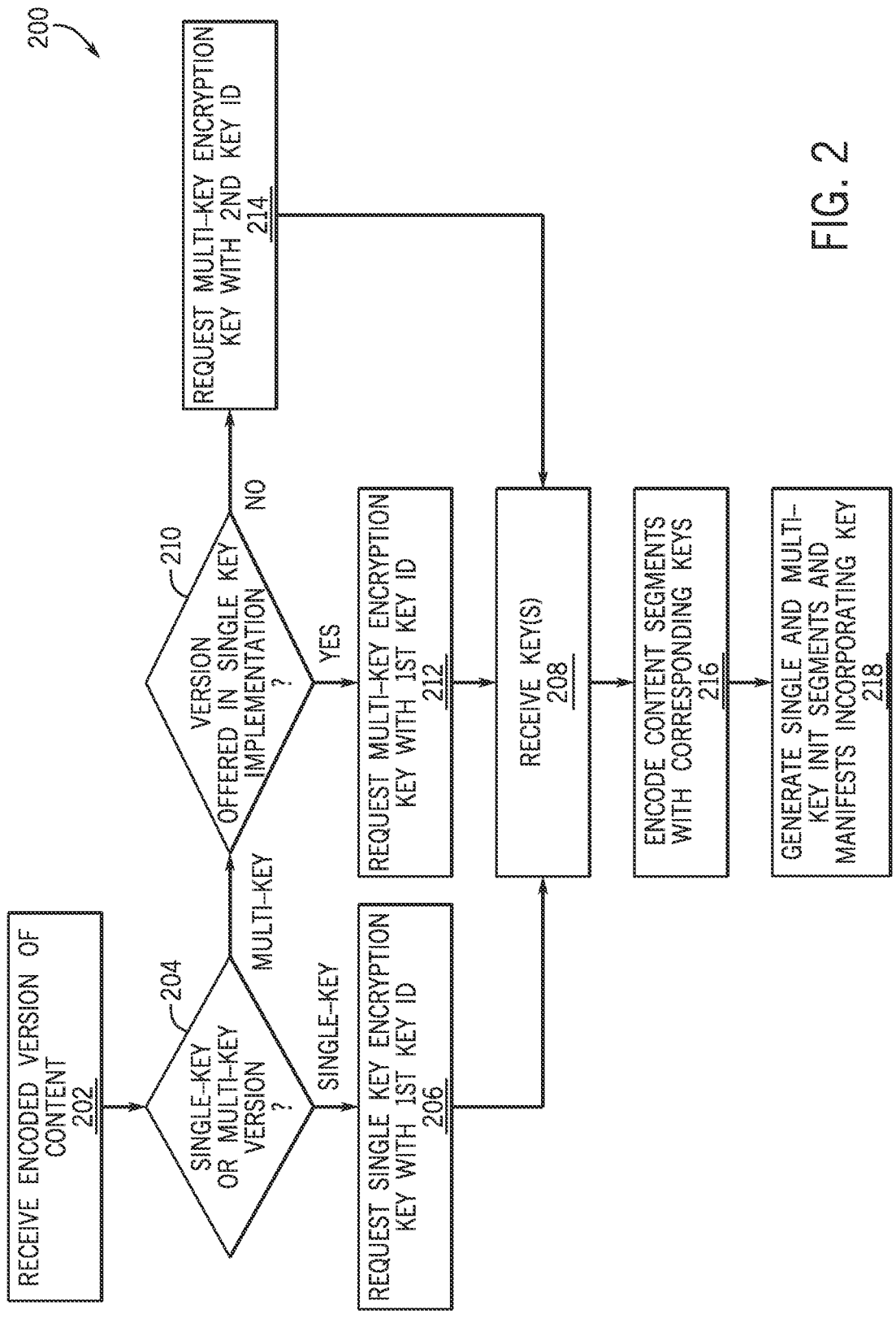
FIG. 2 is a flowchart, illustrating a process for implementing common segment hybrid encryption packaging, in accordance with one or more embodiments of the present disclosure.

Turning now to the drawings, FIG. 1 is a schematic diagram of a system 100 that provides common segment hybrid encryption packaging, in accordance with one or more embodiments of the present disclosure. FIG. 2 is a flowchart, illustrating a process 200 for implementing common segment hybrid encryption packaging, in accordance with one or more embodiments of the present disclosure. For simplicity, these figures will be discussed together.

As mentioned above, using the system 100, digital content (e.g., versions/renditions of mezzanine content 102 encoded via encoder 104) may be packaged and protected by a single-key and/or a multi-key encryption implementation. For renditions protected by both the single-key and multi-key implementations, common segments, encrypted via the same encryption keys, may be used in both implementations. Thus, only a single set of segments is generated, encrypted, and stored for these renditions across both single-key and multi-key implementations, resulting in increased processing and storage efficiencies when compared to other implementations that for each of these implementations, generate, encode, and store separate segments, despite being a duplicate rendition. This technique of utilizing a single set of segments across both single-key and multi-key encryption implementations is referred to herein as "common segment hybrid encryption packaging."

To perform the common segment hybrid encryption packaging, a specialized hybrid packager 106 may be used. As illustrated, in FIG. 2, the hybrid packager 106 may receive the encoded versions of the content to be packaged (block 202). As mentioned above, the encoded versions may be different versions/renditions of mezzanine content 102. In a hybrid environment where certain of the versions are offered via a single-key encryption implementation and certain versions are offered in a multi-key encryption implementation, certain business rules may be used to identify which versions will be offered via the single-key encryption implementation and/or multi-key encryption implementation. For example, in one embodiment, relatively lower quality content versions (e.g., standard definition (SD) versions) may be offered in both single-key and multi-key encryption implementations, while relatively higher quality content versions (e.g., high definition (HD) and/or ultra high definition (UHD) versions may only be offered in a multi-key encryption implementation, to further protect these higher quality versions. Similarly, basic audio renditions (e.g., stereo) may be offered via both single-key and multi-key encryption implementations, while higher quality audio renditions (e.g., Dolby 5.1, 7.1, Atmos, etc.) may only be offered in multi-key encryption implementations.

The hybrid packager 106 may request encryption keys for both single-key provided content (e.g., via single-key request 108 made to DRM service 110) and multi-key provided content (e.g., via multi-key request 112 made to DRM service 110). To do this, a determination may be made as to whether the received encoded version is to be offered via a single-key or multi-key encryption implementation (decision block 204). Returning to the example embodiment discussed above, SD versions may be offered in single-key encryption implementations and multi-key encryption implementations, while HD content may only be offered in multi-key encryption implementations.

When offered in a single-key encryption implementation, a single-key implementation encryption key may be requested with a first KeyID (block 206), as shown by single-key request 108. In response to the request, the DRM service 110 may provide the single key to be used in the single-key implementation, where it is received by the hybrid packager 106 (block 208). This key is provided in the single key request response 114 of FIG. 1, which is received, enabling the content segments to be encoded with the key (block 216).

As illustrated in FIG. 1, in requesting keys from the DRM service 110, the hybrid packager 106 may provide common a KeyID in requests 108 and 112 for content provided by both single-key and multi-key implementations. To do this, when, at decision block 204, the content version is to be offered in the multi-key encryption implementation, a determination is made as to whether the content version is to also be offered in the single-key encryption implementation (decision block 210). If so, a multi-key encryption implementation encryption key is requested for the first KeyID (block 212).

A first key associated with this Key ID is provided from the DRM service 110 back to the hybrid packager 106, where it is received (block 208). The key received via the Single-Key Response 114 and one of the keys provided in an array of multiple keys provided in the Multi-Key Response 116 are a common key to be used to encrypt segments of content offered in both the single-key and multi-key encryption implementations. For example, in FIG. 1, segments 118 of the digital content versions/renditions provided in both the single-key and multi-key implementations may be encoded with a common key (or a same key) associated with first KeyID via the hybrid packager 106 and stored in the segment/manifest storage 120 (block 216).

In traditional DRM services, when a common KeyID is supplied for a single-key encryption implementation and a multi-key encryption implementation, different keys may be generated/returned by the DRM system. However, the DRM service 110 may include logic that, upon receiving a multi-key encryption key request, identifies, in the request, a previously supplied KeyID for a single-key implementation and generates/returns the same key used in the single-key encryption implementation. In this manner, content segments offered in both single-key and multi-key encryption implementations may be decrypted using the same key.

Further, at decision block 210, when a particular content version is not to be offered in the single-key encryption implementation, in the request 112, one or more additional KeyIDs may be provided, requesting keys for each key that protect content via an additional key other than the key used in the Single-Key implementation (block 214). Keys for each of the supplied KeyIDs may be returned by the DRM service 110 to the hybrid packager 106, where they are received (block 208). This enables the hybrid packager to encode and store segments 122 offered exclusively in the multi-key implementation (block 216).

At block 218, the single-key and multi-key implementations using common segments are generated by the hybrid packager 106, for example. The hybrid packager 106 may generate both a single-key INIT segment 124 to associate with the segments 118 and a single-key manifest 126 that provides an indication of the single key and the encoded content segments 118 to be provided with the single-key encryption implementation. Further, the hybrid packager 106 may generate a multi-key INIT segment 128 and a multi-key manifest 130. The multi-key INIT segment 128 and multi-key manifest 130 provide an indication of the multiple keys (including the single key) and of the encoded content segments 118 and 122 to be offered in the multi-key encryption implementation (block 218). As mentioned herein, at least a portion of the encoded content segments encrypted with the single encryption key may be indicated in both the single-key and multi-key INIT segments and manifests. The manifests 126 and 130 may be stored in the segment/manifest storage 120 for subsequent retrieval/access by content players 132 and/or 134. In this manner, a single encoded version of the segments offered in both the single-key and multi-key encryption implementations is generated, encrypted, and stored.

Based upon the packaging of both a single-key encryption implementation (e.g., via generation of the single-key INIT segment 124 and the single-key manifest 126) and the multi-key encryption implementation (e.g., via generation of the multi-key INIT segment 128 and the multi-key manifest 130), both implementations may be supported by system 100. For example, a content player 132 that only supports single-key encryption may access content segments 118, by being provided with the single-key manifest 126 pointing to the single-key INIT segment 124, associated segments 118, and an indication of the single key used to encrypt the segments 118. Further, content players 134 that support multi-key encryption may access content segments 118 and 122, by being provided with the multi-key manifest 130 that provides an indication of the multi-key INIT segment 128, the segments 118 and 122, and an indication of the keys (e.g., the common key and additional keys) used to encrypt the segments 118 and 122.

Figure 3:
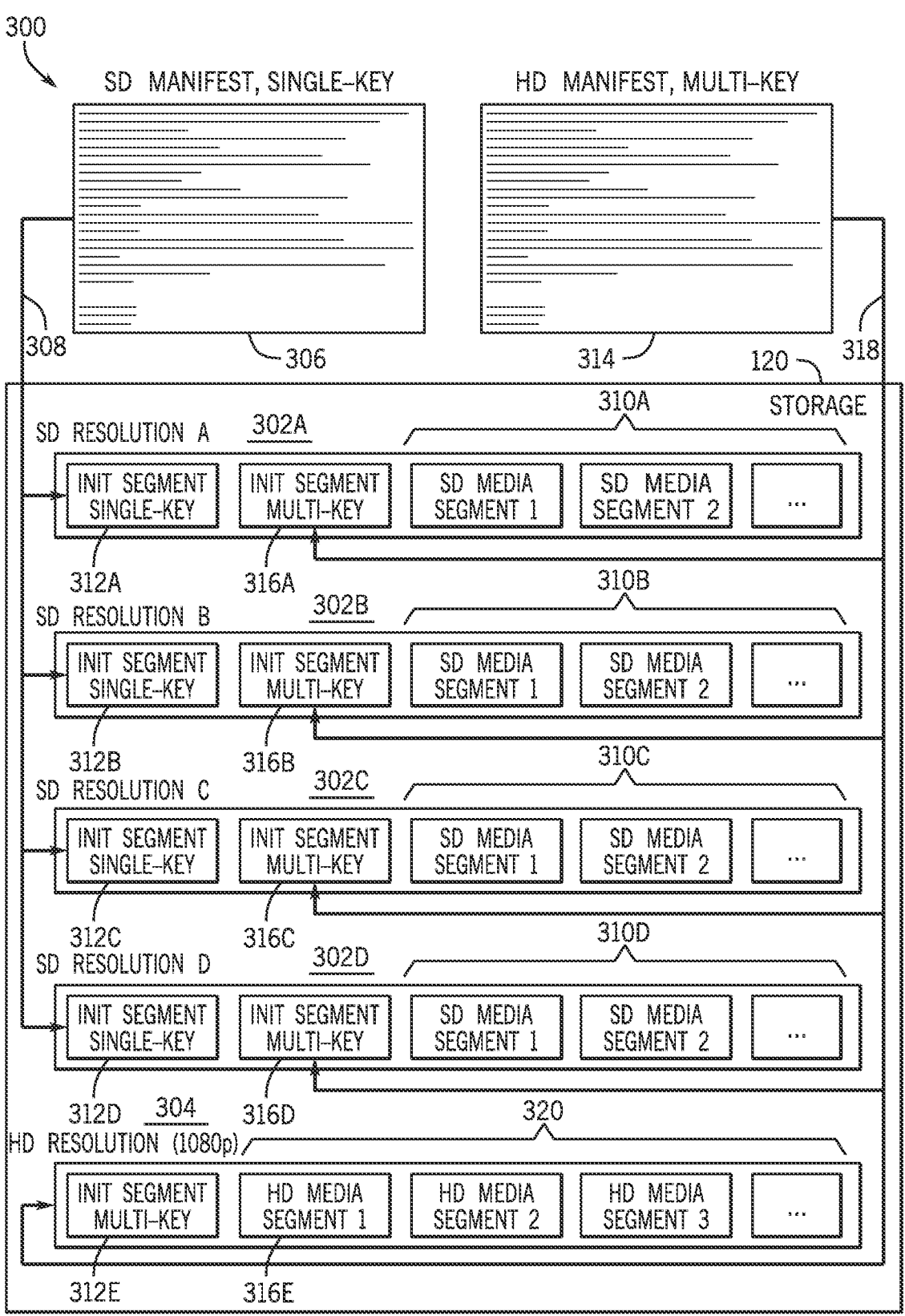
FIG. 3 is a schematic diagram, illustrating results of common segment hybrid encryption packaging, in accordance with one or more embodiments of the present disclosure.

FIG. 3 is a schematic diagram, illustrating an example 300 of common segment hybrid encryption packaging results, in accordance with one or more embodiments of the present disclosure. As illustrated, the segment/manifest storage 120 stores segments associated with five versions of content, four of which are SD (versions 302A, 302B, 302C, and 302D (collectively referred to as versions 302)) and one of which is HD (version 304). Returning to our example above of business rules that dictate that SD versions of the content should be offered in both single-key and multi-key encryption implementations, but HD versions of the content should be offered only in multi-key encryption implementations, versions 302 are offered in (e.g., via indication in) the single-key manifest 306, while version 304 is not offered in (e.g., by not being indicated in) the single-key manifest 306, as indicated by arrow 308. Segments 310A, B, C, and D, corresponding to the versions 302, are encrypted via the single key, and the single-key INIT segments 312A, 312B, 312C, and 312D (collectively INIT segments 312), corresponding to the versions 302 are generated, indicating the single key.

For the multi-key encryption implementation, the multi-key manifest 314 and multi-key INIT segments 316A, 316B, 316C, 316D, and 316E (collectively INIT segments 316) for each of the versions offered in the multi-key encryption implementations are generated. As may be appreciated, each of the versions 302 have two INIT segments 312 and 316, the INIT segments providing key information for the single-key encryption implementation and the multi-key encryption implementation, respectively. Each of the versions 302, both for the single-key and multi-key encryption implementations, may use the same encrypted segments 310. Accordingly, the INIT segments 312A-D and 316A-D and the key information provided in both the single-key manifest 306 and multi-key manifest may each provide an indication of the single-key encryption key (or the common key) with respect to versions 302. Further, both manifests (306 and 314) indicate common content segments 310 for playback of the versions 302.

However, versions encrypted with an additional/alternative key may only be offered in the multi-key encryption implementation. For example, version 304 has only the multi-key INIT segment 316E, as version 304 is only to be offered with a multi-key encryption implementation. In addition to indications of the version 302, the multi-key manifest 314 includes an indication of version 304 to be offered by the multi-key encryption implementation, as indicated by arrow 318. Further, an indication of content segments 320, encrypted with a second encryption key may be provided in the manifest 314.

As may be appreciated, in the illustrated example, segments 310 are generated, encrypted, and stored only once for versions 302 and shareable by multiple manifests of different types (e.g., an SD manifest and an HD manifest). This results in significant processing power and storage savings, as a significant number of content titles and corresponding versions/renditions of those content titles may result in a large number of versions that may no longer need to be duplicated and stored for the different encryption implementations.

Figure 4:
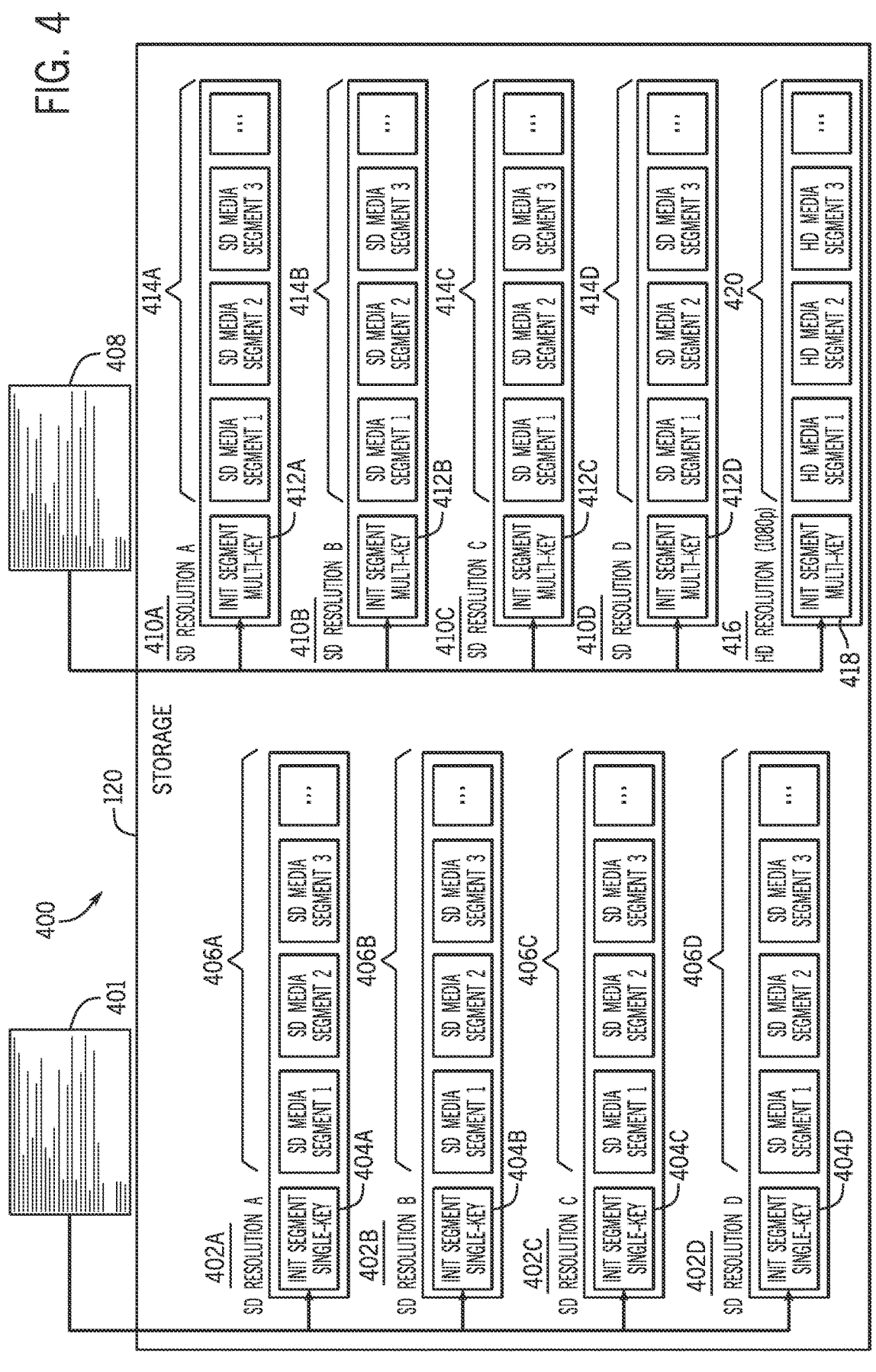
FIG. 4 is a schematic diagram, illustrating packaging results that support both single and multi-key encryption, but without common segment packaging.

To illustrate this, FIG. 4 provides an example 400 illustrating a contrast of the common segment hybrid encryption packaging results of FIG. 3. In the example 400, a single-key manifest 401 is generated and points to encrypted versions 402A, 402B, 402C, and 402D (collectively versions 402), each of the versions 402 having a corresponding single-key INIT segment 404A, 404B, 404C, and 404D (collectively single-key INIT segments 404). Each of the versions 402 includes encoded segments 406A, 406B, 406C, and 406D (collectively segments 406), encrypted with the single key.

With respect to the multi-key encryption implementation, the multi-key manifest 408 includes multi-key copies 410A, 410B, 410C, and 410D (collectively copies 410) of the versions 402 that are encrypted with a different key than versions 402. Each copy has its own multi-key INIT segment 412A, 412B, 412C, and 4124D (collectively INIT segments 412) and their own copy of encoded/encrypted content segments 414A, 414B, 414C, and 414D (collectively segments 414).

Additionally, the multi-key manifest 408 includes an indication to version 416, which is exclusively offered through the multi-key encryption implementation. Version 416 includes a multi-key INIT segment 418 that provides key information for the encryption key used in the encryption of segments 420 of version 416.

As may be appreciated, this example 400 provides a significantly higher processing and storage burden than example 300. For instance, example 400 requires encoding/encryption of duplicate segments 414 and storage of the duplicate segments 414 in the segment/manifest storage 120. As the number of content titles and/or versions increase, this duplicative encoding/encryption and storage may create significant inefficiencies within the system.

FIG. 5 is an illustrative example of a single-key manifest 500, in accordance with one or more embodiments of the present disclosure. As illustrated, the single-key manifest 500 provides a single-key PSSH header 502 providing an indication of the single key associated with the encryption of versions offered by the single-key encryption implementation. The manifest 500 provides an indication 504 of the single-key INIT segment and an indication of the content segments 506. This enables a content player to access the offered versions of the content.

FIG. 6 is an illustrative example of a multi-key manifest 600, in accordance with one or more embodiments of the present disclosure. As illustrated, the multi-key manifest 600 provides a multi-key PSSH header 602 providing an indication of the single key associated with the encryption of versions offered by the single-key encryption implementation and additional keys associated with the encrypted versions offered exclusively through the multi-key encryption implementation. The manifest 600 provides an indication 604 of the multi-key INIT segment and an indication of the content segments 606. It is important to note that while the indication 604 of the multi-key INIT segment is different than the indication 504 of FIG. 5 (because a different INIT segment is used for the multi-key encryption implementation than the single-key encryption implementation), the indication of the content segments 606 for the content segments offered in both implementations is the same as the indication of the content segments 506 of FIG. 5. As may be appreciated, this is to share common content segments of versions offered across both the single-key encryption implementation and the multi-key encryption implementation. While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A tangible, non-transitory, computer-readable medium, comprising computer-readable instructions that, when executed by one or more processors of one or more computers, cause the one or more computers to:

receive encoded content;

package the encoded content into encrypted content segments via common segment hybrid encryption packaging that creates a single-key encryption implementation and a multi-key encryption implementation where at least a portion of the encrypted content segments are common to both the single-key encryption implementation and the multi-key encryption implementation, wherein the common segment hybrid encryption packaging uses a common encryption key in both the single-key encryption implementation and the multi-key encryption implementation for the at least portion of the encrypted content segments common to both the single-key encryption implementation and the multi-key encryption implementation;

generate a single-key encryption implementation manifest and INIT segment that indicate the common encryption key for use by the at least portion of the encrypted content segments common to both the single-key encryption implementation and the multi-key encryption implementation; and generate a multi-key encryption implementation manifest and INIT segment that indicate the common encryption key for use by the at least portion of the encrypted content segments common to both the single-key encryption implementation and the multi-key encryption implementation.

2. The tangible, non-transitory computer-readable medium of claim 1, wherein a single copy of the at least portion of the encrypted content segments common to both the single-key encryption implementation and the multi-key encryption implementation are stored for use in both the single-key encryption implementation and the multi-key encryption implementation.

3. The tangible, non-transitory computer-readable medium of claim 2, wherein the single copy of the at least portion of the encrypted content segments common to both the single-key encryption implementation and the multi-key encryption implementation are associated with both a single-key encryption implementation INIT segment and a multi-key encryption implementation INIT segment.

4. A tangible, non-transitory, computer-readable medium, comprising computer-readable instructions that, when executed by one or more processors of one or more computers, cause the one or more computers to:

receive encoded content;

package the encoded content into encrypted content segments via common segment hybrid encryption packaging that creates a single-key encryption implementation and a multi-key encryption implementation where at least a portion of the encrypted content segments are common to both the single-key encryption implementation and the multi-key encryption implementation;

generate a single-key encryption implementation INIT segment that indicates the at least portion of the encrypted content segments common to both the single-key encryption implementation and the multi-key encryption implementation; and generate a multi-key encryption implementation manifest that indicates the at least portion of the encrypted content segments common to both the single-key encryption implementation and the multi-key encryption implementation.

5. A tangible, non-transitory, computer-readable medium, comprising computer-readable instructions that, when executed by one or more processors of one or more computers, cause the one or more computers to:

receive encoded content;

identify a version of the encoded content to be offered in a multi-key encryption implementation but not a single-key encryption implementation; and package the encoded content into encrypted content segments via common segment hybrid encryption packaging that creates the single-key encryption implementation and the multi-key encryption implementation where at least a portion of the encrypted content segments are common to both the single-key encryption implementation and the multi-key encryption implementation, by: packaging the version of the encoded content into second encrypted content segments that are encrypted with a second key different than a first key used to encrypt the at least portion of the encrypted content segments that are common to both the single-key encryption implementation and the multi-key encryption implementation.

6. The tangible, non-transitory computer-readable medium of claim 5, comprising computer-readable instructions that, when executed by the one or more processors of the one or more computers, cause the one or more computers to:

generate a multi-key encryption implementation manifest and INIT segment that indicate the second key for use by the second encrypted content segments.

7. The tangible, non-transitory computer-readable medium of claim 6, comprising computer-readable instructions that, when executed by the one or more processors of the one or more computers, generate a single-key encryption implementation manifest and INIT segment that does not include an indication of the second encrypted content segments.

8. A computer-implemented method, comprising:

receiving encoded content; and packaging the encoded content into encrypted content segments via common segment hybrid encryption packaging that creates a single-key encryption implementation and a multi-key encryption implementation where at least a portion of the encrypted content segments are common to both the single-key encryption implementation and the multi-key encryption implementation, by:

requesting a first encryption key for the at least portion of the encrypted content segments that are common to both the single-key encryption implementation and the multi-key encryption implementation;

requesting a second encryption key for second encrypted content segments that are to be offered via the multi-key encryption implementation but not the single-key encryption implementation;

providing the first encryption key for use with both the single-key encryption implementation and the multi-key encryption implementation; and providing the second encryption key for use with the multi-key encryption implementation but not the single-key encryption implementation.

9. The computer-implemented method of claim 8, comprising creating the single-key encryption implementation and the multi-key encryption implementation, by:

creating a single-key INIT segment indicating the first encryption key;

creating a single-key manifest that indicates the at least portion of the encrypted content segments that are common to both the single-key encryption implementation and the multi-key encryption implementation and the single-key INIT segment;

creating a multi-key INIT segment indicating both the first encryption key and the second encryption key; and creating a multi-key manifest that indicates the at least portion of the encrypted content segments that are common to both the single-key encryption implementation and the multi-key encryption implementation, the second encrypted content segments, and the multi-key INIT segment.

10. The computer-implemented method of claim 9, comprising:

providing the single-key encryption implementation for use by content players that do not support the multi-key encryption implementation; and providing the multi-key encryption implementation for use by content players that do support the multi-key encryption implementation.

11. The computer-implemented method of claim 8, wherein:

the second encrypted content segments comprise video segments of a particular version of content; and the at least portion of the encrypted content segments that are common to both the single-key encryption implementation and the multi-key encryption implementation comprise audio segments associated with the video segments of the particular version of content.

12. A system, comprising:

a single-key manifest stored on a first tangible, computer-readable medium;

a multi-key manifest stored on the first tangible, computer-readable medium; and a datastore comprising a second tangible, computer-readable medium, configured to store a single copy of encrypted content segments of a particular encoded version of content indicated as playback segments in both the single-key manifest of a single-key encryption implementation and the multi-key manifest of a multi-key encryption implementation, wherein the single copy of encrypted content segments is associated with both a single-key INIT segment and a multi-key INIT segment.

13. The system of claim 12, wherein the single-key manifest comprises an indication of the single-key INIT segment and the multi-key manifest comprises an indication of the multi-key INIT segment.

14. The system of claim 12, wherein both the single-key manifest and the multi-key manifest use a common encryption key for decrypting the encrypted content segments that are common to both the single-key encryption implementation and the multi-key encryption implementation.

15. The system of claim 14, wherein the datastore is configured to store second encrypted segments of a second encoded version of the content indicated as playback segments in the multi-key manifest but not the single-key manifest, and wherein the multi-key manifest indicates a second encryption key, different than the common encryption key, for decrypting the second encrypted segments.

\* \* \* \* \*